United States Patent

[11] 3,631,767

| [72] | Inventor | Ernst Meier<br>Frankfurt am Main, Germany |
|------|----------|-------------------------------------------|
| [21] | Appl. No. | 9,864 |
| [22] | Filed | Feb. 9, 1970 |
| [45] | Patented | Jan. 4, 1972 |
| [73] | Assignee | International Telephone and Telegraph Corporation<br>New York, N.Y. |
| [32] | Priority | Feb. 17, 1969 |
| [33] | | Germany |
| [31] | | P 19 07 873.0 |

[54] ACTUATING CYLINDER
6 Claims, 3 Drawing Figs.

[52] U.S. Cl. ................................................ 92/165, 92/169, 188/370, 277/188, 308/4
[51] Int. Cl. ........................................ B60t 11/10, F16j 15/00
[50] Field of Search .......................................... 92/165, 168, 169; 308/4; 277/24, 188; 188/322, 370; 123/193 C

[56] References Cited
UNITED STATES PATENTS

| 2,470,540 | 5/1949 | Young .......................... | 308/4 |
| 2,942,582 | 6/1960 | Dempster et al. ............. | 308/4 X |
| 2,963,175 | 12/1960 | Thornhill ...................... | 308/4 X |
| 3,153,539 | 10/1964 | Flick ............................ | 92/168 X |
| 3,476,221 | 10/1969 | Schanz ......................... | 92/165 X |
| 3,478,650 | 11/1969 | Schrader ...................... | 92/168 |
| 3,540,741 | 10/1970 | Le Febvre .................... | 92/168 X |
| 3,549,154 | 12/1970 | Jones ............................ | 277/165 X |
| 3,535,942 | 10/1970 | Kateb ........................... | 188/370 |

FOREIGN PATENTS

| 251,426 | 7/1962 | Australia ...................... | 277/24 |
| 831,829 | 5/1957 | Great Britain ............... | 188/370 |

*Primary Examiner*—Martin P. Schwadron
*Assistant Examiner*—Allen M. Ostrager
*Attorneys*—C. Cornell Remsen, Jr., Walter J. Baum and Paul W. Hemminger

ABSTRACT: A disc brake wheel cylinder in which the open end of the cylinder is protected by a wear- and corrosion-resistant insert in the form of a collar which is retained by a groove in the wall of the cylinder.

PATENTED JAN 4 1972

3,631,767

Inventor
Ernst Meier

By Gennaro L Pasquale

Agent

ACTUATING CYLINDER

BACKGROUND OF THE INVENTION

1. Field of the Invention

The invention relates to an actuating cylinder, specifically a wheel cylinder for disc brakes.

2. Description of Prior Art

The sealing of piston rods and plunger rods in hydraulic cylinders is a problem in engineering which has not yet been solved satisfactorily. The problem is that the piston rod or the plunger operates dryly outside the sealing ring in the cylinder housing. This results in wear, corrosion, jamming of the piston and finally the outer edge of the cylinder breaks. To solve this problem or to at least improve the situation various proposals have been made.

For instance: the guiding length of the piston which operates dryly in the cylinder is reduced to a minimum. This is, however, disadvantageous for plungers of which the guiding length is dependent at least to some extent on their diameters to avoid tilting or jamming when they are on their pushed-out position. This measure also increases the wear of pistons with piston rods of small diameter because of the higher specific contact pressure.

To reduce at least corrosion, waterproof protecting caps have been applied which engage the outer edge of the cylinder as well as the piston or the piston rod, so as to form a seal. Unfortunately pressure differences occur in the space enclosed by the protecting cap so that the enclosed air condenses sometimes and the moisture leads to corrosion and in some cases initiates electrolytic processes which in turn result in a dissolution of high-quality surface protection. Besides, experience has proved that such protecting caps gradually become more or less pervious to water, the more so since they are subjected to a certain fulling process and therefore the walls must not be too thick.

Pistons with piston rods are unlikely to be tilted or jammed, because of the double guiding, but this is a particular danger with plungers when they are in a pushed-out position. This danger is obviated by providing a relatively large length of the dry-operating piston guide surface. On the opposite side of the seal the wet-operating piston guide surfaces become smaller as the piston advances. Apart from the crevice corrosion which often occurs such long guidings need lubrication and they require so much space that they cannot be used where space is limited.

Usually the compromise consists in a shorter piston guiding which involves the danger that the outer edge of the cylinder crumbles or even cracks.

Such problems exist generally with respect to hydraulic cylinders. But the problems are even worse for disc brakes since the disc brakes, as a part of the unsprung mass of a vehicle axle, are subjected to the mud and dust of the road, to corrosion caused by water and salt and partly to temperatures of more than 200° C. Moreover, there is so little space that neither conventional provision nor servicing, e.g., lubricating the pistons or the like, can be applied.

From experience it can be said that said difficulties are raised by disc brakes, indeed, to a greater extent. Many different types of protecting caps and scraped rings of rubber or synthetic have been produced. Chrome-plated piston surfaces, cadmium-plated and galvanized cylinder housings have been applied. But not even stainless steel used for the disc brake pistons or kanigen treated or eloxadized surfaces were able to solve the problem definitely.

SUMMARY OF THE INVENTION

It is an object of this invention to provide a piston cylinder assembly, particularly for vehicle brakes, in which the part of the cylinder operating without lubrication is more resistant to corrosion and wear than the rest of the cylinder.

This invention achieves this object by providing a cylinder with a separate cylinder collar at the front of the cylinder, the collar being of an elastic, wear-resistant and rustproof material.

The collar may be a ring of preferably highly wear-resistant, rustproof material inserted into an annular groove in the cylinder wall in the region of the cylinder opening.

The ring may consist of a base material with wear-resistant and rustproof surfaces, e.g., of nickel or steel with a molybdenum-sprayed surface.

The collar may also be an elastic split ring movably anchored in a groove of the cylinder aperture. When the ring is assembled the gap is filled by a ring sector having the same profile as the ring. The cross section of the ring is broadly U-shaped or stepped. For instance, one arm of the ring profile engages in a groove in the cylinder aperture while the other arm which may be stepped protrudes over the cylinder housing and holds a protecting cap.

A modified embodiment of the invention provides that a one-piece ring without a gap is cast integrally with the cylinder. The ring is then finished together with the cylinder bore. The flexibility of the cylinder collar has to be guaranteed by choosing an elastic material.

DESCRIPTION OF THE PREFERRED EMBODIMENT

Figure 1:
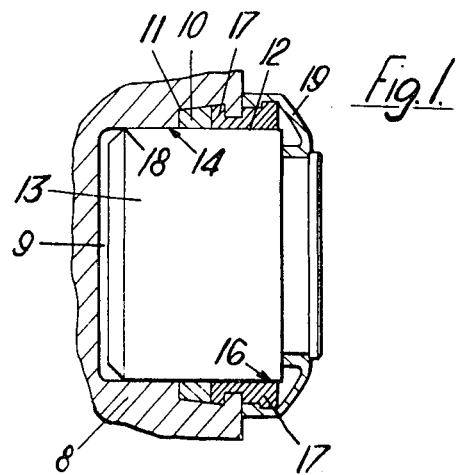
FIG. 1 shows a cross section of a disc brake wheel cylinder embodying the present invention.
Figure 2:
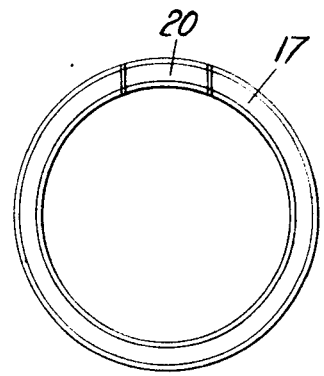
FIG. 2 shows the split ring collar of FIG. 1.

Referring to FIG. 1 and 2 the cylinder housing 8 contains a cylinder recess 9, with a groove 11 for the sealing ring at the open end of the cylinder and a sealing ring 10 in the groove. The piston 13 moves in the cylinder; in a disc brake the piston lies with its front face against the pad carrier plate and when actuated it pushes the pad towards the brake disc. The dry-operating part of the piston guiding surface of the cylinder has the reference numeral 12, while the wet-operating part is denoted by 14. The cylinder 8 and the cylinder collar 17 are two separate component parts, the latter being made of a wear-resistant and rustproof material or of a material having an adequate surface. This can be, e.g., nickel or steel with a molybdenum-sprayed surface. The cylinder collar is a split ring 17 which is compressible like a piston ring so that it can snap in a groove 11 at the open end of the cylinder. The gap between the two ends of the split ring 17 can be filled by another part 20 of the same profile. The cross section of the ring is broadly U-shaped one limb being preferably stepped. When the sealing ring 10 and the piston 13 have been mounted the axial position of the ring 17, serving as a piston guide, is fixed. It is unessential whether the cylinder collar or the guiding ring are directly anchored in the annular groove, originally provided for the sealing ring or at a different grooved place in the cylinder aperture. In the embodiment represented in FIG. 1 one limb of the ring profile engages in the annular groove 11 while the other limb which can be stepped protrudes over the cylinder housing so that a protecting cap 19 can be attached, if necessary. This connection of the cylinder collar with the cylinder provides a certain flexibility of the axis of these two component parts so that the cylinder collar cannot be as easily damaged as before when the axis of the piston 13 tilts with respect to the axis of the cylinder 8. Especially in disc brakes the brake pads do not wear uniformly but tend to wear in an inclined manner. The brake piston follows this inclined position automatically and thus stresses the dry-operating cylinder guiding at 16 of the piston guiding 17 according to the invention as strongly as the wet-operating piston guiding of the cylinder at 18. But due to the flexibility of the guiding ring 17 this stress is reduced to a certain extent.

Figure 3:
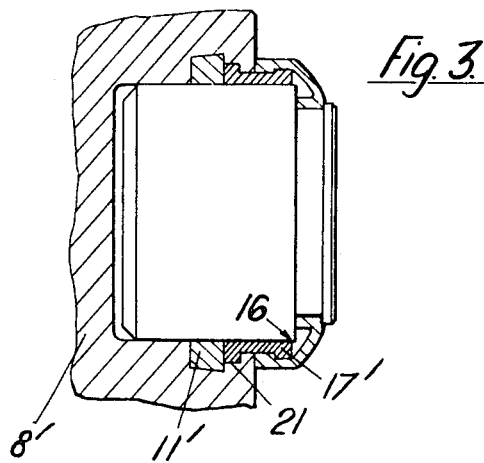
FIG. 3 shows a partial cross section through the edge of a cylinder with a different means for anchoring the ring.

The way in which the ring is anchored in the cylinder aperture can be widely varied without influencing the idea of the invention. In FIG. 1 the piston guiding 17 according to the invention is anchored in the sealing ring groove 11 of the brake cylinder 8. FIG. 3 shows a different anchoring. Beside the groove 11' for the sealing ring a second groove 21 is provided in the cylinder wall which is engaged by one limb of the ring 17'.

In a further embodiment of the invention, not illustrated, the cylinder is cast around the guiding ring; the ring may be made of one piece without a split and finished together with the cylinder bore. In this embodiment, also, the ring is made of a wear-resistant and rustproof material. Its flexibility is guaranteed by choosing an accordingly elastic material.

The advantage of the invention is that different material can be used for the piston collar and the cylinder housing and in this way can better be adapted to the external stress. The flexibility of the ring prevents jamming of the piston as well as crumbling of the collar edges.

Although not shown in the drawings, the ring may be made from a synthetic high-quality, heat-resistant material which has horny properties and the synthetic ring may have a collar on its outer surface which snaps into a matching groove in the cylinder wall. To achieve a secure fit in the cylinder wall, the ring, and particularly the collar, are made as large as the resilience of the material will allow. To facilitate assembly the cylinder edge will have a chamfer of approximately 10°.

It will be appreciated that the invention illustrated and described herein may be modified by those skilled in the art without deviating from the spirit and scope of the invention as set forth in the following claims.

I claim as my invention:

1. An actuating cylinder assembly, particularly for use in a disc brake, including a piston working in a cylinder, in which the edge of the open end of the cylinder is protected by an insert of a material which is more resistant to wear and corrosion that is the cylinder material, the cylinder being relieved to accommodate the insert, said insert being retained by a groove in the relieved inner surface of the cylinder and being provided with an inner surface on which the piston slides, said insert having a limb projecting from it which engages the groove and a further limb projecting from it so that its cross section is in the shape of a U, and in which said further limb protrudes beyond the rim of the cylinder and retains in place a protective cap.

2. An actuating cylinder assembly, particularly for use in a disc brake, including a piston working in a cylinder, in which the edge of the open end of the cylinder is protected by an insert of a material which is more resistant to wear and corrosion than is the cylinder material, the cylinder being relieved to accommodate the insert, said insert being retained by a groove in the relieved inner surface of the cylinder and being provided with an inner surface on which the piston slides, said relieving and said groove therein being continuous around said cylinder, and said insert having a limb projecting from it which engages said groove and a further limb projecting from it so that its cross section is in the shape of a U, and in which said further limb protrudes beyond the rim of the cylinder and retains in place a protective cap.

3. An actuating cylinder assembly particularly for use in a disc brake, including a piston working in a cylinder, in which the edge of the open end of the cylinder is protected by an insert of a material which is more resistant to wear and corrosion than is the cylinder material, the cylinder being relieved to accommodate the insert, said insert being retained by a groove in the relieved inner surface of the cylinder and being provided with an inner surface on which the piston slides, said relieving and said groove therein being continuous around said cylinder, and said insert is a split ring which can be inserted in said groove after said cylinder is made, said insert having a limb projecting from it which engages said groove and a further limb projecting from it so that its cross section is in the shape of a U, and in which said further limb protrudes beyond the rim of the cylinder and retains in place a protective cap.

4. The actuating cylinder assembly of claim 3 wherein said further limb has a stepped inner surface.

5. An actuating cylinder assembly, particularly for use in a disc brake, including a piston working in a cylinder, in which the edge of the open end of the cylinder is protected by an insert of a material which is more resistant to wear and corrosion than is the cylinder material, the cylinder being relieved to accommodate the insert, said insert being retained by a groove in the relieved inner surface of the cylinder and being provided with an inner surface on which the piston slides, said relieving and said groove therein being continuous around said cylinder, and said insert is an unbroken ring around which said cylinder is formed, said insert having a limb projecting from it which engages said groove and a further limb projecting from it so that its cross section is in the shape of a U, and in which said further limb protrudes beyond the rim of the cylinder and retains in place a protective cap.

6. The actuating cylinder assembly of claim 5 wherein said further limb has a stepped inner surface.

* * * * *